United States Patent
Wolters

[19]

[11] Patent Number: 5,803,378
[45] Date of Patent: Sep. 8, 1998

[54] ROTARY GRATER

[75] Inventor: Karen Wolters, Chicago, Ill.

[73] Assignee: The Pampered Chef, Ltd., Addison, Ill.

[21] Appl. No.: 920,159

[22] Filed: Aug. 26, 1997

Related U.S. Application Data

[63] Continuation-in-part of Ser. No. 601,666, Feb. 15, 1996, Pat. No. 5,660,341.

[51] Int. Cl.⁶ .................................................. B02C 19/20
[52] U.S. Cl. ........................ 241/93; 241/100; 241/169.1; 241/273.3
[58] Field of Search ................................ 241/92, 93, 100, 241/169.1, 222, 273.1, 273.2, 273.3, 278.1, 280; 99/510, 567

[56] References Cited

U.S. PATENT DOCUMENTS

| | | | |
|---|---|---|---|
| 197,383 | 11/1877 | Livingstone | 241/273.3 |
| D. 235,501 | 6/1975 | Mantelet | D7/47 |
| 507,287 | 10/1893 | Scarles | 241/169.1 |
| 2,001,075 | 5/1935 | Sundstrand | 241/100 X |
| 2,271,175 | 1/1942 | Mantelet | 241/280 |
| 2,502,867 | 4/1950 | Mantelet | 241/273.3 |
| 4,081,145 | 3/1978 | Moe et al. | 241/93 |
| 4,227,656 | 10/1980 | Engebretsen | 241/93 |
| 4,884,755 | 12/1989 | Hedrington | 241/37.5 |
| 5,148,995 | 9/1992 | Hurst | 241/30 |
| 5,364,037 | 11/1994 | Bigelow | 241/93 |
| 5,562,256 | 10/1996 | Wolman et al. | 241/169.1 |
| 5,660,341 | 8/1997 | Perkins et al. | 241/93 |

Primary Examiner—John M. Husar
Attorney, Agent, or Firm—Olson & Hierl, Ltd.

[57] ABSTRACT

An improved hand-held, hand-crank operated rotary drum-type grater for cheese and the like is provided which has a housing that has portions which are slidably engagable with mouth adjacent lip portions of a predetermined collection vessel for grated material. The grater preferably utilizes a cage-type drum body having a cylindrical surface defined by a metal sheet having bladed perforations. The drum is insertable into either end of a cylindrical cavity defined transversely in the unitary housing of the grater hopper rotary drum and thereafter the drum is engagable with a crank. The vessel can be associated with either opposite side of the housing and the association of this vessel with either housing side does not interfere with grater operation.

6 Claims, 3 Drawing Sheets

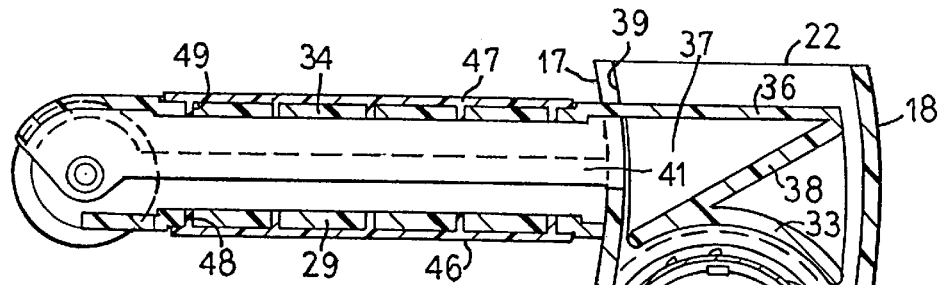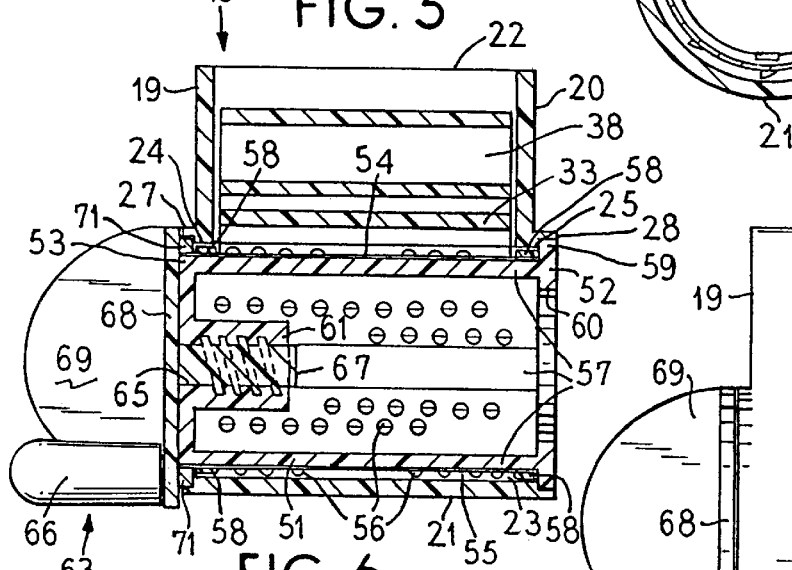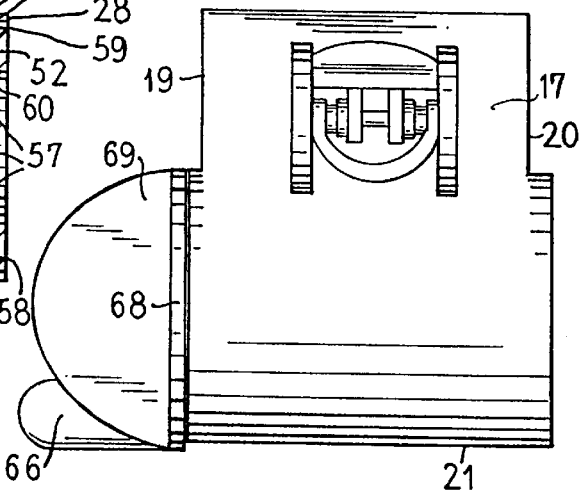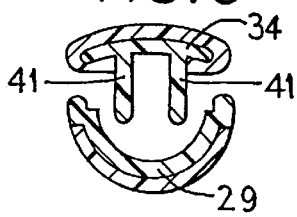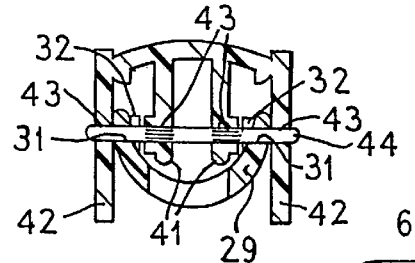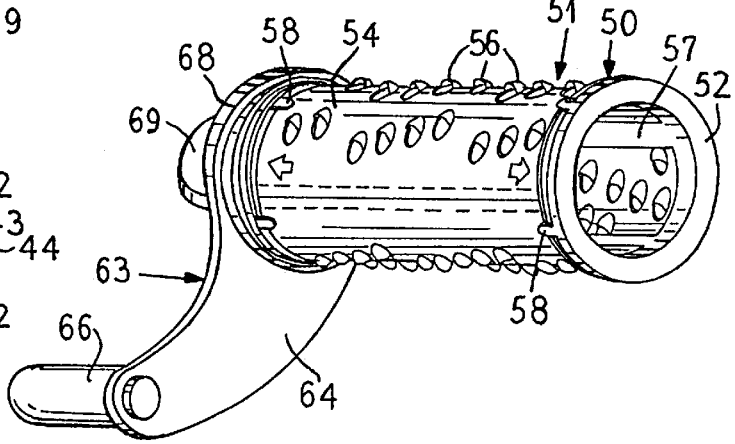

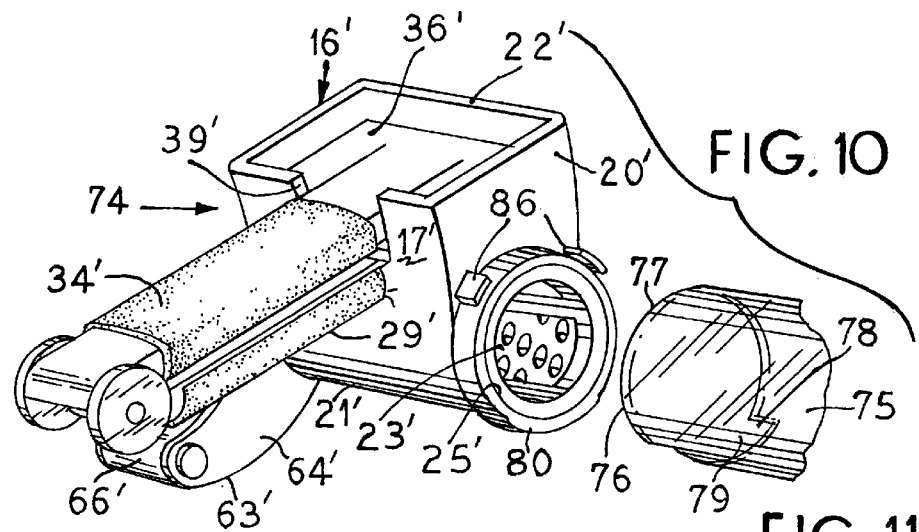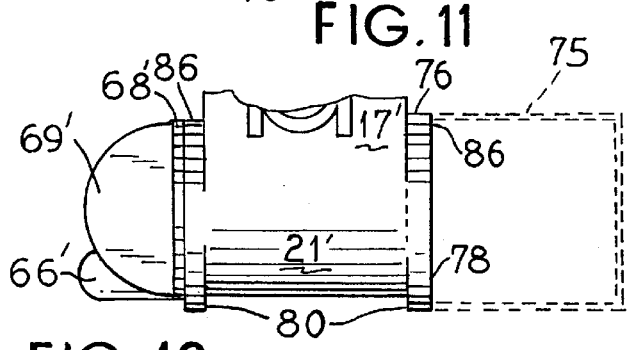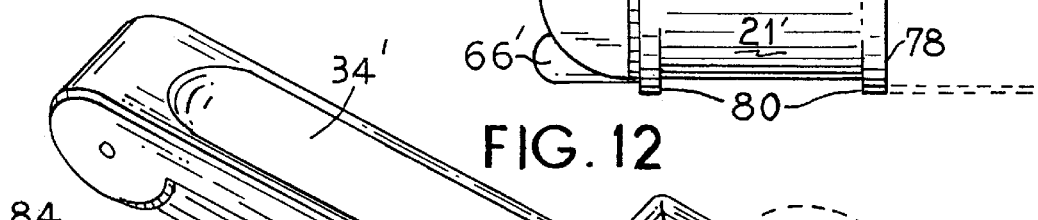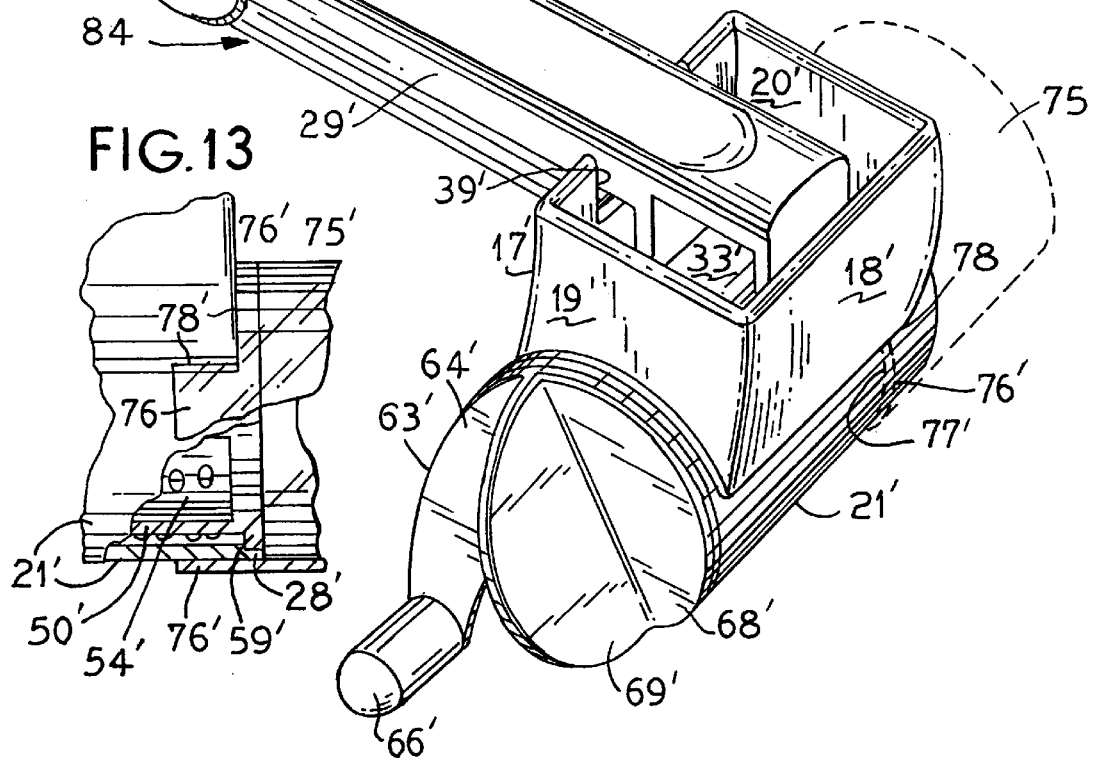

ROTARY GRATER

RELATED APPLICATION

This application is a continuation-in-part of earlier filed U.S. patent application Ser. No. 08/601,666, filed Feb. 15, 1996, now U.S. Pat. No. 5,660,341, issued Aug. 26, 1997.

FIELD OF THE INVENTION

This invention relates to improved rotary drum-type graters for cheese and similar food products.

BACKGROUND OF THE INVENTION

Various hand-held, hand-crank operated, rotary drum-type graters for cheese and the like that incorporate molded plastic or metal components have been previously developed. See, for example, Mantelet U.S. Design Pat. No. 235,501 or Shun U.S. Design Pat. No. 276,202. Such graters, however, include various disadvantages.

For example, if the upper portion of the hopper can be pivotably inclined relative to the lower portion of the hopper, or if the rotary drum and hand crank assembly cannot be readily disassembled, then it is often difficult to access various grater locations so that it is difficult to cleanse such a grater through hand or mechanical washing.

In addition, such a grater is commonly made so that during use, the hand crank is located only on one side of the hopper, usually the right side. Thus, the grater is most convenient for use by right-handed people, the crank being turned by the right hand while the support handle of the hopper, along with the press support arm, if present, are held and clamped together by the left hand.

In the above identified U.S. Pat. No. 5,660,341, an improved rotary drum-type grater is provided wherein the drum and hand crank are reversible relative to the grater housing so that the grater can be used by either right-or left-handed people. Also, the improved grater is adapted for thorough cleansing during post-use washings.

However, this improved grater suffers from a disadvantage that is common to prior art rotary drum-type graters: It is difficult and inconvenient to collect in a simple and waste-free manner the freshly grated material such as cheese that is produced during operation of the grater. Also, it is awkward and inconvenient to store and dispense collected grated material.

While a conventional vessel with a closure can be used for storing grated material, such a vessel is not directly connectable to and about the discharge orifice of a rotary drum grater. Such a connection should preferably be maintained during a grating operation and all freshly grated material produced should preferably be collectable in the vessel.

The present invention provides an unexpected and very useful improvement in the grater of the type disclosed in the above-identified U.S. Pat. No. 5,660,341. The improvement enables a user to removably connect a predetermined vessel with the grated material discharge orifice region of such a grater. The connection between vessel and grater is achievable regardless of the side of the grater that is associated with the crank of the grater. Also, the connection does not interfere with the grater operation.

SUMMARY OF THE INVENTION

This invention relates to an improved hand-held, hand-crank operated, drum-type grater for grating cheese and similar food products wherein the grater is reversibly and slidably associatable with a predetermined vessel, thereby to achieve collection of grated food products as produced by the grater.

The inventive grater is adapted for use by either left- or right-handed users. The grater is also adapted to incorporate molded plastic or metal components, but preferably includes a drum having a cylindrical surface defined by a metal sheet that has a desired pattern of edged projections defined therein.

The grater employs relatively few component parts. The components that contact food during a grating operation can be readily disassembled after use. The grater is thus easily and thoroughly cleanable.

The grater is structured so that the hand crank is locatable either on the right or left side of the hopper and the rotary drum housing. Thus, the crank can be turned by either the right hand or the left hand based on the preference of the user.

The hopper and rotary drum housing is characterized by a unitary construction, thereby improving grater strength, ease in food processing and cleanability. A lower portion of the hopper housing is integral with the rotary drum housing which defines a transversely extending, cylindrical cavity that receives the drum. The hopper and rotary drum housing is provided with an integrally formed, laterally and outwardly projecting improved support handle means, and an improved combination of outwardly projecting arm means and terminally associated press plate means is provided. During grater operation, the handle means and the arm means are held in adjacent relationship by one hand of the user.

The drum can be variously comprised, but preferably includes a cage-type cylinder that is preferably overlaid circumferentially with a metal sheet (preferably stainless steel) that has edged projections.

The drum has a proximal end and a distal end. The proximal end of the drum is insertable into either end of the cylindrical cavity defined by the rotary drum housing. The distal end of the drum is provided with a radially outwardly projecting rim flange that limits axial movement yet permits drum rotation in the cylindrical cavity. The proximal end of the drum is provided with a threaded, axially oriented receiving hub.

The crank can be variously comprised but preferably incorporates an arm having at one end a boss and a threaded crankshaft that is threadably engagable with the drum hub. The boss also includes a longitudinally projecting rim flange which, when the crank is assembled with the drum, limits axial movement of the drum yet permits drum rotation in the cylindrical cavity. Preferably, the boss further includes an exterior upstanding wing for user gripping during assembly and disassembly.

Thus, the proximal end of the drum is insertable into either end of the rotary drum cylindrical cavity and is extended therein so as to be positioned adjacent the opposite cavity end. The crankshaft is then threadably engaged with the proximal end of the drum and the grater is ready for use.

In accord with the present improvement invention, the hopper and rotary drum housing in the region adjacent each end of the cylindrical cavity is configured for slidable association with the mouth-adjacent lip region of a vessel having a generally circular mouth. The mouth has a single circumferentially elongated segment removed from a mouth-adjacent lip region. This mouth configuration achieves a non-interfering associatable relationship with structural features of the hopper and rotary drum housing without any interference with the grater operation or grater movable components (that is, the drum and the crank).

Other and further objects, aims, features, purposes, advantages, embodiments, applications and the like will be apparent to those skilled in the art from the present specification taken with the accompanying drawings and the appended claims.

BRIEF DESCRIPTION OF DRAWINGS

In the drawings:

FIG. 4 is a vertical sectional view taken longitudinally and medially along the line IV—IV of FIG. 2;

FIG. 5 is a transverse vertical sectional view taken along the line V—V of FIG. 2, the crank shaft being shown unsectioned for clarity purposes;

FIG. 6 is a transverse vertical sectional view taken along the line VI—VI of FIG. 2;

FIG. 7 is a transverse vertical sectional view taken along the line VII—VII of FIG. 2;

FIG. 8 is a rear and elevational view of the embodiment of FIG. 1, some parts thereof being broken away and some parts thereof being shown in section;

FIG. 9 is a perspective subassembly view of the threadably but reversibly engaged combination of grating drum and hand crank employed in, but shown apart from the embodiment of FIG. 1;

FIG. 10 is a partially exploded perspective view of the rotary drum grater of FIG. 1 which has been modified to permit association of the grater housing with the mouth region of an illustrative vessel of the predetermined type (shown fragmentarily);

FIG. 11 is a front end elevational view of the grater of FIG. 10 showing in phantom the predetermined vessel in functional association with the grater;

FIG. 12 is a perspective view of an alternative embodiment of a rotary drum grater of the type employed in the present invention showing in phantom the illustrative vessel in functional association with the grater; and FIG. 13 is a fragmentary front end elevational view of the grater of FIG. 12 showing the predetermined vessel in functional association therewith, some parts being broken away and some parts being shown in section.

DETAILED DESCRIPTION

Figure 1:
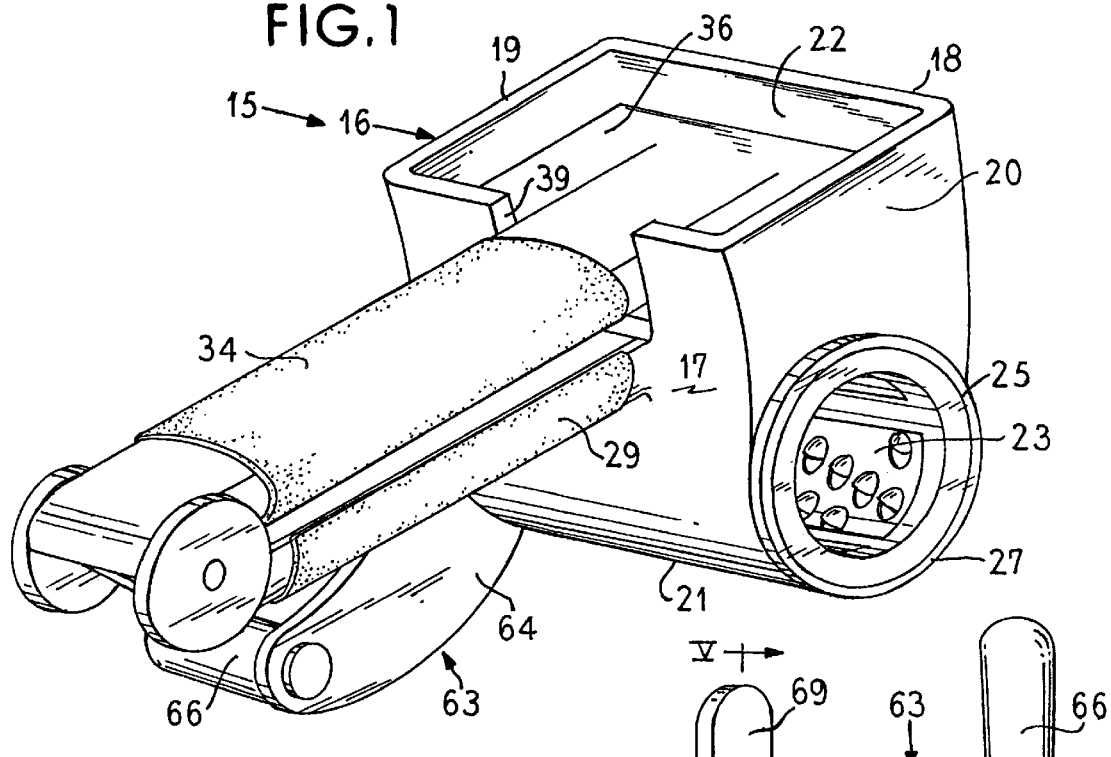
FIG. 1 is a perspective view of one embodiment of a rotary drum grater of the type employed in the present invention.

Referring to the drawings, one embodiment 15 of a grater of this invention which is suitable for grating a food stuff such as cheese, chocolate or the like is shown. Grater 15 incorporates a hopper housing 16 having opposed lateral sides 17 and 18 and opposed transverse sides 19 and 20. The top 22 of hopper 16 is open and the (gravitationally) lower and bottom portions of lateral sides 17 and 18 curve towards one another, and meet and join integrally and indistinctly to form a generally continuous, cylindrically curved bottom region 21 that defines a rotary drum housing. A transversely extending, interiorly upwardly open cylindrical channel 23 is defined at the lower end of hopper 16 in the bottom region 21. Channel 23 has circular opposed end apertures 24 and 25, one aperture being defined in each transverse side 19 and 20, respectively. The apertures 24 and 25 and the cylindrical channel 23 are generally coaxial relative to the cylindrical curvature of the bottom region 21.

In the region of each aperture 24 and 25, the respective hopper sides 19 and 20 are each provided with a transversely outwardly projecting and circumferentially formed flange 27 and 28, respectively. The inside diameters of each of the flanges 27 and 28 are equal and this diameter is slightly larger than the internal (upwardly incomplete or open) cylindrical diameter of channel 23 and of apertures 24 and 25. The inside respective longitudinal (relative to channel 23) faces of the flanges 27 and 28 extend parallel to the axis of channel 23 and the radially extending exposed shoulder region of each flange 27 and 28 is preferably substantially flat.

The adjacent lateral side 17 (relative to transverse sides 19 and 20) of hopper 16 is provided with an integral, elongated support handle 29. Supporting and reinforcing triangularly configured (in side elevation) ribs (not shown) can be provided, if desired, between adjacent exterior portions of handle 29 and side 17. The handle 29 has, in transverse cross section (see FIGS. 6 and 7), a general C-configuration so that the exterior lower surfaces thereof are generally rounded. The upper outer terminal region of handle 29 is provided with a pair of transversely aligned holes 31 (one hole being in each end edge portion of the C-shape, see FIG. 7). Preferably, and as shown, a portion of the end edge of the C-shape is interiorly transversely thickened and strengthened by integral stub projections 32, each projection 32 having a flattened interior face that is in spaced, parallel relationship relative to the other.

The grater 15 is provided with a combination of a hopper press plate 33 and an integrally associated elongated arm 34 which extends laterally outwardly from a side region of press plate 33. Press plate 33 slidably moves up or down in hopper 16. The lower or food-contacting outside surface of press plate 33 has a radius of curvature which preferably matches the radius of curvature of the channel 23. In vertically upwardly spaced relationship to press plate 33, an integrally joined flattened support and connecting rectangular plate 36 is provided. At each opposite transverse side of plate 36, and in the mid-region of plate 36 integrally formed walls 37 generally vertically integrally extend between plate 36 and plate 23. Also, a diagonally extending integral brace 38 (see FIG. 4) is provided that extends from the front lateral side of plate 36 to the rear lateral side of plate 33.

The elongated upper surface portions of arm 34 are generally convexly upwardly curved. This arm 34 surface curvature conveniently and illustratively commences in a mid-region of the upper face of plate 36. For reasons of convenience, compactness and leverage, the arm 34 here extends, like handle 29, in a straight configuration. In order for the arm 34 to avoid interference with the side 17 of hopper 16, and in order to permit the height of the arm 34-associated press plate 33 to be changed as a grating operation proceeds in the assembled, operative grater 15, a notch 39 is medially defined in the upper portion of side 17 to accommodate therewithin entrance into, and vertical movement of, arm 34. The interior or bottom surface portions of arm 34 are provided with a pair of longitudinally medially extending, equally spaced ribs 41 that commence adjacent to plate 36 and extend rearwardly to the terminus or end of arm 34.

The relative spatial orientations of handle 29 and of arm 34 are preferably (and as shown) such that arm 34 extends in spaced, adjacent, parallel overlying relationship relative to handle 29 when the open or forward face of press plate 33 is located at the margin of the (extended) curvature of the channel 23 (see FIG. 4). In this position, the ribs 41 are in contacting relationship relative to the bottom edge of the notch 39 and thereby limit the downward movement of press plate 33.

The opposite rear opposing outside portions of the arm 34 are each provided with an integrally formed mounting and guidance plate 42 (paired). Each plate 42 is in spaced, parallel relationship relative to the other. For exemplary purposes, each plate 42 is shown with a circular perimeter, but those skilled in the art will appreciate that various perimeter configurations can be used. In the region of the plates 42, the ribs 41 are downwardly distended. A set of transversely aligned apertures 43 is provided in each of the plates 42 and ribs 41. These apertures 43 are adapted for alignment with the holes 31. As so aligned, a pivot pin 44 is extended through holes 31 and apertures 43, thereby permitting arm 34 to pivot upwardly and downwardly relative to handle 29. The limit of upward pivotal movement is reached when the terminus of arm 34 abuts against the outer end of handle 29 (see FIG. 4). Typically, pin 44 is not separated from arm 34 and handle 29 during cleaning or storage of grater 15. Various alternative pivotal connecting arrangements can be employed for arm 34 and handle 29.

Preferably and as shown, the exposed concave facial or surface portions of each of arm 34 and handle 29 is provided with a layer of cushioning material 47 and 46, respectively, that extends over these curved surface portions. The combination of hopper 16 and handle 29, and the combination of press plate 33 and arm 34, as described above, are each conveniently and preferably formed of a molded plastic of a character adapted for such a structural application as here contemplated in grater 15. As those skilled in the art will readily appreciate, such a plastic can be, for example, an ABS resin, an acrylate resin, a polyester resin, a nylon resin, or the like, as desired. The handle 29 and the arm 34 can each be preliminarily molded so as to have a curved surface configuration that is adapted for a subsequent molding thereover in a second independent molding operation of the desired cushioning layers 46 and 47. Illustratively, each of handle 29 and arm 34 is preferably initially molded with a plurality of surface apertures 48 and 49, respectively.

The apertures 48 and 49 become filled with the material of the cushioning layer during the subsequent molding; such a filled aperture arrangement provides anchoring sites for the cushioning material. The material of the cushioning layer, as those skilled in the art will readily appreciate, can be comprised of any one of various plastics, for example, a vinyl plastisol, a formed-in-place foamed polyurethane elastomer, a olefinic elastomer or the like, as desired. Various handle, arm and press plate structures and configurations can be utilized in a grater of this invention. Preferably, all the plastics used in a grater of this invention are insensitive to grease and oil and stable under the conditions reached in automatic dishwashers. The amount of manually applied force exerted between the arm 34 and the handle 29 determines the pressure applied to a foodstuff that is located between press plate 33 and drum 51 and is undergoing grating.

The grating drum 51 employed in a grater of this invention can be variously structured. The grater 15 preferably employs a cage-type cylindrical drum 51 having a body 50 and cylindrical side wall portions 54. The portions 54 are comprised of a preformed, generally continuously extending, sheet metal, preferably stainless steel. In such a sheet metal, a desired pattern of apertured grating protrusions (or perforations) 56 (see FIG. 9) are formed such that each protrusion 56 has a raised edged region adapted for the cutting or scraping of food stuffs positioned relative thereto during one circumferential direction of movement of side wall portions 54, and wherein preferably all protrusions 56 are similar in grating effect. The fabrication of such a perforated sheet metal structure is known to the prior art. Protrusion 56 selection can vary according to the grating desired.

The body 50 of drum 51 is preferably of unitary molded construction and can be conveniently comprised of a plastic that can be selected from among those indicated above as being suitable for use in the combination comprising hopper 16 and handle 29 or the like as desired. At each of its opposite ends, the drum 51 body 50 is provided with a generally frame member, preferably a ring-like frame member 52 at the distal end of the drum 51 and a disk-like frame member 53 at the proximal end of the drum 51. Frame member 52 has a central opening 60. Frame members 52 and 53 are in spaced, parallel coaxial relationship to each other.

The diameter of frame member 53 is about equal to or slightly less than the diameter of the side wall portions 54. The radial spacing 55 in the assembled drum 51 between the outside surface of the cylindrical side wall portions 54 and the radially adjacent inside cylindrical surface portions of the channel 23 is preferably chosen to be at least equal to the maximum radial height of the protrusions 56 and may be somewhat greater, if desired, as those skilled in the art will readily appreciate. A series of circumferentially equally spaced integrally formed stringers 57 is provided (illustratively four) that extend unitarily and longitudinally between respective circumferential regions of the frame members 52 and 53. Taken together, the stringers 57 define an open, cage-type cylindrical configuration. The radially outside surfaces of each of the stringers 57 is preferably slightly curved so as to equal the radius of curvature of the cylinder and of the respective frame members 52 and 53. When the perforated sheet metal (with the desired protrusions 56 therein) is laid circumferentially around and over the stringers 57, the cylindrical side wall portions 54 are achieved. To hold the perforated sheet metal in the desired circumferential position, each frame member 52 and 53 is provided with a plurality of circumferentially spaced, interiorly opening holding tabs 58 (illustratively four) that are preferably located in radially adjacent relationship to each stringer 57. The radial thickness of each tab 58 is preferably such that the circumferential outside surface thereof is radially slightly less than the adjacent diameter of channel 23 while the inside surface thereof has a portion that is sufficiently radially spaced from an adjacent stringer 57 to accommodate the thickness of the sheet metal. Edge portions of the sheet metal adjacent to each tab 58 are tucked or slid thereunder and are held thereby.

The diameters of the frame member 53 and of the side wall portions 54 are such that they are each slidably receivable in and through each respective aperture 24 and 25, and are axially slidable through the channel 23.

The frame member 52 is provided with a circumferentially extending, radially outwardly projecting rim flange 59 which is adapted to be nestably received diametrically within either one of the circumferential flanges 27 and 28 when the proximal end of drum 51 and frame member 53 has been inserted into and moved through the channel 23 from one of apertures 24 or 25 to the opposite one thereof.

The body 50 is also provided at its proximal end with an axially located and axially extending cylindrical hub 61 which is unitarily formed with frame member 53. Hub 61 has a central channel 65 whose circumferentially extending inside wall portions are threaded.

The grater 15 further includes a crank 63 which includes an arm 64 that in the assembled grater 15 generally radially outwardly extends from the proximal end frame member 53 of the drum 51. Arm 64 at its outer end terminates in a laterally (or longitudinally relative to drum 51) outwardly extending crank pin 66 that is adapted for grasping between the thumb and finger of either the left- or right hand of a user. If desired, pin 66 can be journaled for rotation relative to arm 64. Arm 64 at its inner end terminates in a laterally extending integrally formed crank shaft 67 that is here exteriorly circumferentially threaded. The arm 64 in the vicinity of crank shaft 67 is provided with a radially (relative to drum 51) enlarged boss 68.

Relative to the assembled grater 15, the outside face of boss 68 is provided preferably and as shown with an integral, upstanding, axially (relative to crank shaft 67) outwardly projecting wing 69 that adapted for grasping between the thumb and forefinger of one hand of a user. Wing 69 is useful during the assembly and disassembly of crank 63 relative to drum 51 and from the grater 15.

When the drum is positioned operatively in the channel 23, the crank shaft 67 is threadably engagable with the hub 61. The threads associated with each of the crank shaft 67 and the hub 61 are preferably clockwise oriented when the drum 51 is adapted to grate when rotated in a clockwise direction during a grating operation by turning the crank pin 66.

The boss 68 is further provided on its inside surface in radially spaced relationship to crank shaft 67 with a circumferentially extending, longitudinally inwardly projecting boss flange 71 whose length and thickness are adapted for slidably fitting into the space existing between either flange 27 or 28 and the outside circumferential edge portion of the frame member 53 in the assembled grater 15. The boss flange 71 cooperates with the boss 68 and the rim flange 59 to allow rotation of the drum 51 and to maintain the spacing 55 in the assembled grater 15. The boss 68 and the flanges 59 and 71 also cooperate to limit axial travel of the drum 51 in the assembled grater 15.

Thus, the grater 15 can be assembled so that the crank 63 is located adjacent either transverse side 19 or 20 of hopper 16. Preferably, the lateral sides are curved so as to correspond to the arcuate travel path of press plate 33 relative to pin 44.

During a grating operation, grated food particles pass through the apertures associated with each protrusion 56 in the cylindrical side wall portions 54, enter the central cavity of the drum 51 and leave the grater 15 through the central opening 60 of ring frame member 52.

Figure 2:
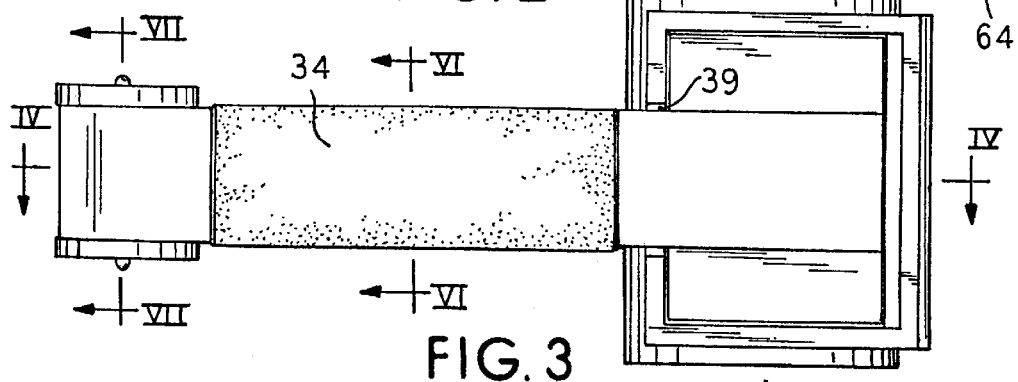
FIG. 2 is a top plan view of the embodiment of FIG. 1.
Figure 3:
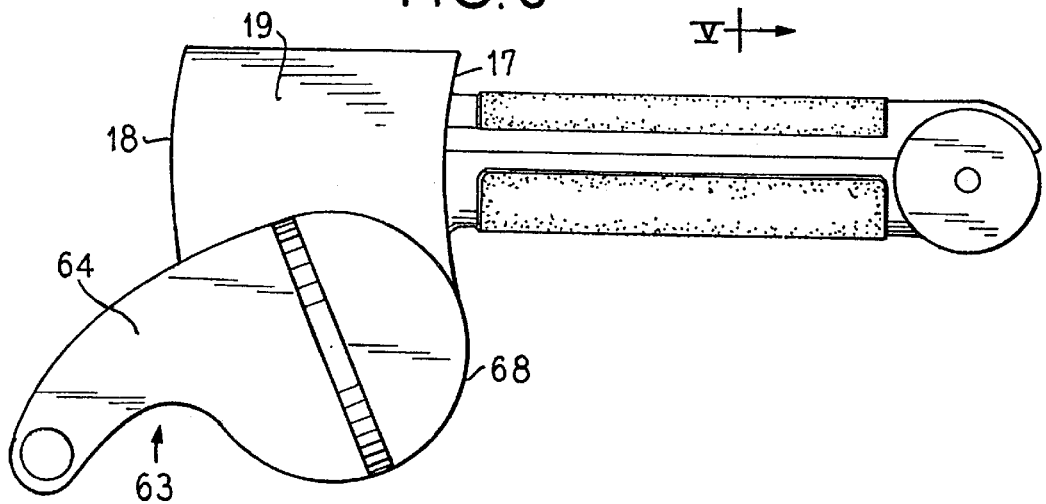
FIG. 3 is a side elevational view of the embodiment of FIG. 1.

Referring to FIGS. 10 and 11, there is seen an alternative grater embodiment 74 which is similar to the grater embodiment 15 shown in FIGS. 1–9, but which has been modified to permit association therewith of a grated material receiving vessel 75. The components of the grater 74 which are similar to corresponding components of the grater 15 are similarly numbered but with the addition of prime marks thereto for convenient identification purposes.

Each of the channel ends or apertures 24' and 25' of the rotary drum housing is adapted to receive thereover slidably the mouth-adjacent lip portions 76 of the vessel 75 which has a generally round mouth 77. The mouth is further characterized by having a circumferentially elongated segment 78 removed from a region of the mouth-adjacent lip portions 76 thereby to provide segmental void 79 adjacent to the mouth 77.

The grater housing of grater 74 further defines, on an exterior portion thereof adjacent to each of the channel ends 24' and 25', aligning cam means for engaging the segmental void 79 and the mouth-adjacent lip portions 76 when these lip portions are slidably engaged over each one of the outwardly projecting and circumferentially extending housing flanges 27' and 28', respectively.

In the grater 74, the aligning cam means is defined by a raised surface region 80 and region 80 extends circumferentially along each one of the flanges 27' and 28'. The circumferential extent of the region 80 is slightly less than the circumferential distance along the segmental void 79. Thus, when the vessel 75 is engaged with either one of the flanges 27' or 28', the segmental void is engaged with at least one of the side edge portions of the raise surface region 80. In grater 74, the raised surface region 21 is adjacent to an outer edge portion of each one of the channel ends 24' and 25' (see FIG. 12, for example). If desired, alternatively, raised surface region 80 can be axially spaced from, but in transversely adjacent relationship to, and outer edge portion of each one of the channel ends 24' and 25'.

Referring to FIGS. 12 and 13, there is seen an alternative grater embodiment 84 which is similar to grater 15. The graters 15, 74 and 84 are preferably employed in the practice of the present invention with grater 84 now being most preferred. As in the case of grater 74, components of grater 84 which correspond to components in the grater 15 are similarly numbered but with the addition of prime marks thereto for identification purposes.

In the grater 84, differences in the handle design, the hopper press plate 33, the elongated arm 34 and the inner connections are utilized. Also, the relationship between the hopper wall portions and the cylindrical drum portions in the housing structure are slightly changed. In the housing, the hopper retains a generally cross-sectionally quadrilateral wall configuration. The hopper walls include bottom portions that join respective side wall portions of the drum housing. The lower outside wall portions of the hopper are in inwardly spaced relationship to the outside edge portions of each of the housing flanges 27' and 28'. Thereby, when mouth-adjacent lip portions 76 of the vessel 75 are slidably received over either one of the channel ends 24' and 23' of the rotary drum housing, the segmental void 79 is engagable with lower corner-adjacent wall portions of the hopper housing.

In the grater 74, for vessel 75 alignment purposes and for association of the vessel 75 with each one of the channel ends, each channel end 24' and 25' is provided with a pair of circumferentially spaced stabilizer lugs 86 which are each preferably integrally formed with the housing of the grater. Relative to the apertures 24 and 25, the spacing between each of the lugs 86 and the outside wall portions of each of the opposite ends 24' and 25' is such that the lip portions 76 of the vessel 75 can be slidably inserted therebetween. Preferably and as shown, each of the lugs 86 is adjacent to an opposed end wall of the hopper housing but is in abutting relationship to the adjacent side walls of the hopper housing. When the vessel 75 is fully engaged with the grater 74, the vessel 75 is located on one side of the grater 74 as illustrated, for example, in FIG. 12.

When the vessel 75 is associated with one end of the grater 84, the vessel 75 has the appearance and a location such as is illustrated in FIG. 13, for example.

Other and further arrangements, variations, embodiments, applications and the like for the present invention will be apparent from the foregoing disclosure and teachings and no undue limitations are to be implied or inferred therefrom.

What is claimed is:

1. A grater for food products comprising:

a handle-equipped, integral housing defining both a hopper for receiving gratable food and an integral rotary drum cylindrical channel, said channel extending transversely across the bottom of said hopper, said channel having opposed channel ends that each extend outwardly from adjacent hopper portions, said channel ends each being exteriorly circumferentially rounded;

a hopper press plate and integral arm means, said arm means being hand graspable;

a drum having a cylindrical side wall that is perforated for grating and having a proximal end and an opposed distal end, said distal end having rim flange means, said proximal end having a threaded axial hub means, said proximal end being insertable into said channel from each said opposed ends;

a crank having a crank arm with opposite ends, a crank pin means at one said end, and a circumferentially threaded crank shaft means at the opposite said end, said crank having rim flange means located about said crank arm adjacent said crank shaft;

said crank shaft means being threadably engagable with said hub means, and, when so engaged, said crank pin means being hand turnable, thereby to revolve said drum in said channel;

each of said channel ends being adapted to receive thereover slidably mouth-adjacent lip portions of a generally round mouthed-vessel;

said vessel mouth being further characterized by having a circumferentially elongated segment removed from a region of said mouth adjacent lip portions, thereby to define a segmental void adjacent to said mouth; and said housing further defining on an exterior portion thereof adjacent to each of said channel ends aligning cam means for engaging said segmental void when said mouth-adjacent lip portions are so slidably received over either one of said channel ends.

2. The grater of claim 1 wherein said aligning cam means is defined by a raised surface region that circumferentially extends along each one of said channel ends, the circumferential extent of said region being less than the circumferential distance along said segmental void whereby said segmental void is engagable with at least side edge portions of said raised surface region.

3. The grater of claim 2 wherein said raised surface region is adjacent to an outer edge portion of one of said channel ends.

4. The grater of claim 2 wherein said raised surface region is in axially spaced but transversely adjacent relationship to an outer edge position of one of said channel ends.

5. The grater of claim 1 wherein, in said housing, said hopper has a generally cross-sectionally quadrilateral wall configuration, and said hopper walls include portions that join respective outside wall portions of said channel in adjacent spaced relationship to the outer edge portions of each of said channel ends whereby, when said mouth-adjacent lip portions are so slidably received over either one of said channel ends, said segmental void is engagable with at least corner-adjacent wall portions of said hopper.

6. The grater of claim 1 which is so engaged with said vessel.

* * * * *